United States Patent
Nachbagauer et al.

(10) Patent No.: US 12,137,712 B2
(45) Date of Patent: Nov. 12, 2024

(54) COMPOSITION, ITS USE FOR THE PREPARATION OF SWEETENING SYRUPS AND BEVERAGES, AND PREPARATION OF BEVERAGES

(71) Applicant: Red Bull GmbH, Fuschl am See (AT)

(72) Inventors: Josef Nachbagauer, Fuschl am See (AT); Manfred Urban-Klik, Fuschl am See (AT); Volker Boehringer, Fuschl am See (AT)

(73) Assignee: Red Bull GmbH, Fuschl am See (AT)

( * ) Notice: Subject to any disclaimer, the term of this patent is extended or adjusted under 35 U.S.C. 154(b) by 893 days.

(21) Appl. No.: 17/058,880

(22) PCT Filed: May 24, 2019

(86) PCT No.: PCT/EP2019/063536
§ 371 (c)(1),
(2) Date: Nov. 25, 2020

(87) PCT Pub. No.: WO2019/224381
PCT Pub. Date: Nov. 28, 2019

(65) Prior Publication Data
US 2021/0227856 A1    Jul. 29, 2021

(30) Foreign Application Priority Data
May 25, 2018  (EP) ..................................... 18174277

(51) Int. Cl.
| | | |
|---|---|---|
| *A23L 2/60* | (2006.01) | |
| *A23L 2/39* | (2006.01) | |
| *A23L 27/12* | (2016.01) | |
| *A23L 29/00* | (2016.01) | |
| *A23L 29/30* | (2016.01) | |

(52) U.S. Cl.
CPC .................. *A23L 2/60* (2013.01); *A23L 2/39* (2013.01); *A23L 27/13* (2016.08); *A23L 29/045* (2016.08); *A23L 29/055* (2016.08); *A23L 29/30* (2016.08)

(58) Field of Classification Search
None
See application file for complete search history.

(56) References Cited

U.S. PATENT DOCUMENTS

| | | | |
|---|---|---|---|
| 2007/0116838 A1 | 5/2007 | Prakash et al. | |
| 2011/0293538 A1* | 12/2011 | Ley | .................. A23L 27/86 |
| | | | 514/777 |

FOREIGN PATENT DOCUMENTS

| | | |
|---|---|---|
| EP | 2 386 211 A1 | 11/2011 |
| EP | 2 474 240 A1 | 7/2012 |
| EP | 2 486 806 A1 | 8/2012 |
| WO | 2008/049256 A1 | 5/2008 |
| WO | 2008/112967 A1 | 9/2008 |
| WO | 2008/147726 A1 | 12/2008 |
| WO | 2011/090709 A1 | 7/2011 |
| WO | 2011/146463 A2 | 11/2011 |
| WO | 2011/146463 A3 | 11/2011 |
| WO | 2012/073121 A2 | 6/2012 |
| WO | 2012/073121 A3 | 6/2012 |
| WO | 2012/109585 A1 | 8/2012 |

OTHER PUBLICATIONS

International Search Report for Application No. PCT/EP2019/063536, dated Jul. 3, 2019, 4 pgs.

* cited by examiner

*Primary Examiner* — Jyoti Chawla
(74) *Attorney, Agent, or Firm* — Seed IP Law Group LLP

(57) ABSTRACT

A sweetening or sweetened composition includes sucrose, rubusoside or a rubusoside derivative, and a tannin which may be used in a process for preparing a beverage. Further disclosed is the use of the composition for sweetening beverages as well as for preparing a syrup as a precursor in the preparation of beverages and also as flavoring substance with modifying properties and for reducing the sucrose content in beverages without essentially exhibiting a reduced sweetness sensation. Also disclosed is the use of a combination comprising rubusoside or a rubusoside derivative and a tannin for shortening the lingering sweetness of artificial sweeteners and for shifting the onset of the temporal sweetness sensation of said artificial sweetener towards that of natural sugars.

27 Claims, No Drawings

COMPOSITION, ITS USE FOR THE PREPARATION OF SWEETENING SYRUPS AND BEVERAGES, AND PREPARATION OF BEVERAGES

BACKGROUND

Technical Field

The present disclosure relates to compositions, in particular to sweetening and sweetened compositions, their use for the preparation of sweetening syrups and beverages, as well as to the preparation of said beverages.

Description of the Related Art

Common soft drinks usually contain significant amounts of natural sugars such as sucrose, glucose, fructose, or mixtures thereof. The caloric content of these natural sugars is in the range from 3.6 to 3.9 kcal/g. Many attempts have been made to reduce the caloric content of beverages such as soft drinks. In some instances, natural sugars have been replaced by artificial sweeteners such as aspartame or acesulfame potassium. These artificial sweeteners usually are synthetic compounds having no resemblance to the structure of natural sugars. Another supplement to said natural sugars are sucralose, which is a chlorinated carbohydrate, and steviol glycosides. Both of these sweeteners are experiencing a still increasing demand due to their very low caloric content. Moreover, some steviol glycosides have a sweetening power which is about 240 to 400 times that of the natural sugar sucrose. Steviol glycosides are derived from extracts of the leaves of the *stevia* plant (*Stevia rebaudiana* Bertoni). The four major steviol glycosides found in the leaves of the *stevia* plant are stevioside (about 5 to 10 wt-%), rebaudioside A (about 2 to 4 wt-%), rebaudioside C (about 1 to 2 wt-%) and dulcoside A (about 0.5 to 1 wt-%). Further steviol glycosides which are found in the extract of the leaves of the *stevia* plant, however in rather minute quantities, are rebaudioside B, rebaudioside D and rebaudioside E. The common aglycon of all steviol glycosides is steviol which belongs to the class of diterpenes.

Unfortunately, beverages sweetened with steviol glycosides suffer some significant drawbacks which for many consumers outweigh the high caloric content of conventional beverages. Steviol glycosides are known to cause a bitter and/or licorice-like aftertaste, in some instances also a metallic aftertaste. In addition, the sweet sensation is retarded to a significant extent, that is, the sweetening has a significant onset time. In some cases, steviol glycosides are also responsible for a so-called blunt or dry mouthfeel.

Many attempts have been made to overcome the aforementioned shortcomings. For example, according to WO 2012/073121 A2, the bitter aftertaste of steviol glycosides shall be decreased or eliminated by the reduction or elimination of rebaudioside C or dulcoside A, or both, from *stevia* compositions. However, it has been found that the reduction of rebaudioside C and/or dulcoside A as such does not guarantee a reduction in bitter aftertaste. Moreover, even with *stevia* compositions being void of rebaudioside C or dulcoside A, consumers experience a slow onset and sometimes even a longer duration of the sweetness sensation.

In WO 2008/147726, it is described that a more sugar-like flavor profile shall be obtained by sweetener compositions comprising at least a) one sweetness enhancer such as urea or thiourea, b) at least one sweetener comprising a carbohydrate sweetener, a natural high-potency sweetener, a synthetic high-potency sweetener, or a combination thereof such as rebaudioside compounds, sucralose, aspartame, or acesulfame potassium, and c) at least one sweet taste improving composition selected from the group consisting of carbohydrates, polyols, amino acids, or mixtures thereof.

New sweetened beverage formulations which do not exhibit a bitter aftertaste shall be obtained according to EP 2 474 240 A1 by use of rebaudioside D and an acidulant comprising at least lactic acid and one or both of tartaric acid and citric acid, and no phosphoric acid.

From WO 2011/146463 A2 it can be derived that the bitterness in an otherwise sweet composition containing steviol glycosides shall be masked by incorporating an increased amount, relative to naturally occurring compositions, of rebaudioside D.

EP 2 486 806 A1 discloses a low-calorie orange juice drink which makes use of a mixture of 84 wt-% rebaudioside A and 16 wt-% rebaudioside D. Different from a low-calorie orange juice having been sweetened with a conventional *stevia* extract, a pleasant taste similar to sucrose, a full mouthfeel, and no bitterness and no aftertaste could be observed during sensory evaluation. A similar outcome was observed for a zero-calorie carbonated beverage.

According to WO 2008/112967 A1, the metallic aftertaste experienced with beverages containing conventional steviol glycosides shall be masked by the presence of anisic acid.

And, in WO 2012/109585 A1, it is disclosed that attributes such as bitterness, sweet aftertaste, and licorice flavor of steviol glycosides may be overcome by sweetening compositions comprising a blend of rebaudioside A, rebaudioside B, and steviol glycosides, in particular when the ratio of rebaudioside B to total steviol glycosides in the blend ranges from 0.5% to about 50% and more preferably from about 5% to about 40%.

The aforementioned drawbacks associated with the use of steviol glycosides are still not overcome to a satisfactory extent. It is still desirable to obtain beverages having a much improved sweetness and aroma profile while simultaneously arriving at a significantly reduced sugar content.

BRIEF SUMMARY

Accordingly, the present disclosure provides low-calorie beverages which do not exhibit the disadvantages of the prior art sweetening compositions as outlined above, and which provide a satisfactory sweetness profile. In particular, the present disclosure provides beverages which contain significantly less sugar while not having to sacrifice established sweetness and/or aroma profiles.

The problems underlying the present disclosure have surprisingly been solved by a composition comprising
  a1) sucrose,
  b1) rubusoside and/or at least one rubusoside derivative, and
  c1) at least one tannin and/or a composition or an extract containing at least one tannin, in particular tannic acid and/or at least one tannic acid derivative and/or a composition or an extract containing tannic acid and/or at least one tannic acid derivative, and/or gallic acid and/or at least one gallic acid derivative and/or a composition or an extract containing gallic acid and/or at least one gallic acid derivative, and/or pyrogallic acid and/or at least one pyrogallic acid derivative and/or a composition or an extract containing pyrogallic acid and/or at least one pyrogallic acid derivative, and/or ellagic acid and/or at least one ellagic acid derivative and/or a composition or an extract containing ellagic acid and/or at least one ellagic acid derivative, and d1) optionally hesperitin and/or thaumatine and/or phloretin and/or trilobatin and/or monatin and/or betain, e1) optionally at least one further sweet-tasting natural carbohydrate selected from the group consisting of sweet-tasting natural disaccharides, sweet-tasting natural monosaccharides, sweet-tasting sugar alcohols, and mixtures thereof and/or f1) optionally at least one *stevia* compound, in particular selected from the group consisting of steviol glycosides, enzymatically modified steviol glycosides, in particular glucosylated steviol glycosides, rebaudiosides and mixtures thereof.

The composition of the present disclosure can, for example, be a dry mixture, in particular in powder and/or particulate form, or can be present as an aqueous system, e.g., as a syrup or a beverage. Accordingly, in addition to the components of the composition of the present disclosure as specified in the foregoing as well as below, said composition can also contain water, usually as its major component. Being in the form of a consumable beverage, it can also be referred to as sweetened composition. When present as a dry substance or as a syrup, it can also be referred to as a sweetening composition as it can be used to arrive at, for example, sweetened beverages.

DETAILED DESCRIPTION

In a preferred embodiment of the composition of the present disclosure, in case of being in the form of an aqueous system, in particular in the form of a sweetened composition, e.g., a beverage, comprises:

a1) 30 to 120 g/l, in particular 50 to 100 g/l, and more in particular 65 to 80 g/l sucrose, b1) 30 to 450 mg/i, in particular 100 to 300 mg/i, and more in particular 160 to 220 mg/i, rubusoside and/or at least one rubusoside derivative, c1) 1 to 400 mg/i, in particular 10 mg/l to 300 mg/i, and more in particular 25 to 250 mg/l, tannic acid and/or at least one tannic acid derivative and/or 0.5 to 220 mg/i, in particular 4 mg/l to 170 mg/i, and more in particular 12 to 140 mg/l, gallic acid and/or at least one gallic acid derivative and/or 0.2 to 110 mg/i, in particular 2 mg/l to 85 mg/i, and more in particular 6 to 70 mg/l, pyrogallic acid and/or at least one pyrogallic acid derivative, and/or 1 to 400 mg/i, in particular 10 mg/l to 300 mg/i, and more in particular 25 to 275 mg/l, ellagic acid and/or at least one ellagic acid derivative, and d1) 1 to 750 mg/L, in particular 10 to 500 mg/L, and more in particular 25 to 250 mg/L, hesperitin and/or 0.01 to 10 mg/L, in particular 0.05 to 5 mg/L, and more in particular 0.1 to 2 mg/L, thaumatin and/or 1 to 250 mg/L, in particular 5 to 200 mg/L, and more in particular 10 to 150 mg/L, phloretin and/or 0.1 to 250 mg/L, in particular 1 to 200 mg/L, and more in particular 5 to 150 mg/L, trilobatin and/or 0.01 to 20 mg/L, in particular 0.05 to 10 mg/L, and more in particular 0.1 to 5 mg/L, monatin and/or 0.01 to 20 mg/L, in particular 0.05 to 10 mg/L, and more in particular 0.1 to 5 mg/L, betain, e1) 0 to 60 g/L, in particular 0.1 to 50 g/L, and more in particular 1 to 35 g/L, of the further sweet-tasting natural carbohydrates or of any individual sweet-tasting natural carbohydrate according to e1) being present in the composition, and f1) 0 to 1 g/l, in particular 0.01 to 0.8 g/l, and more in particular 0.05 to 0.6 g/l, and preferably 0.1 to 0.4 g/l, of the at least one *stevia* compound, in particular of one or more rebaudiosides.

It has been surprisingly found that a significant reduction in the amount of natural sugars such as sucrose can be accomplished even without relying on *Stevia* compounds and/or artificial sweeteners, in particular without *Stevia* compounds and artificial sweeteners, but by just using a combination of components a1), b1), and c1).

Beverages of the present disclosure, having an improved mouthfeel and also an improved aroma profile, preferably contain, in addition to sucrose and rubusoside, further sweet-tasting natural carbohydrates and/or sweet-tasting sugar alcohols. In a preferred embodiment, the sweet-tasting natural carbohydrates and the sweet-tasting sugar alcohols are present in combination in the beverages of the present disclosure in a concentration not above 40 g/l, preferably in the range from 5 g/l to 35 g/l and more preferably in the range from 10 g/l to 25 g/l (determined at ambient temperature and 1 bar). Ambient temperature in the meaning of the present disclosure shall mean room temperature, i.e., a temperature in the range from 20° C. to 25° C.

According to a preferred embodiment, in the compositions of the present disclosure allowing for a significant sugar reduction, a the sweet-tasting natural monosaccharide can be present which preferably is selected from the group consisting of fructose, glucose, arabinose, mannose, rhamnose, xylose, tagatose, galactose, and mixtures thereof.

Alternatively or, in particular, in addition in the compositions of the present disclosure besides sucrose another sweet-tasting natural disaccharide can be present which preferably is selected from the group consisting of trehalose, lactose, maltose, and mixtures thereof.

Moreover, alternatively or in addition, in the compositions of the present disclosure, a sweet-tasting sugar alcohol can be present which preferably is selected from the group consisting of erythritol, glycerol, lactitol, maltitol, mannitol, sorbitol, xylitol, galactitol, and mixtures thereof.

The composition of the present disclosure preferably contains at least one natural sweet-tasting carbohydrate, in particular a natural sweet-tasting monosaccharide and/or disaccharide, and no sweet-tasting sugar alcohol.

Suitable tannins according to component c1) to be used with the compositions of the present disclosure can comprise hydrolyzable tannins, non-hydrolyzable tannins or mixtures thereof, hydrolysable tannins being preferred. Hydrolyzable tannins comprise gallotannins and ellagitannins which are both derivatives of 1,2,3,4,6-penta-O-galloyl-µ-d-glucopyranose. Accordingly, suitable tannins can be selected from the group consisting of gallotannins, ellagitannins, and mixtures thereof. Different from gallotannins, ellagitannins generally form macrocycles. The class of ellagitannins is based on polyphenols formed primarily from the oxidative linkage of galloyl groups in 1,2,3,4,6-pentagalloyl glucose. While with ellagitannins the galloyl groups are linked through C-C bonds, the galloyl groups in gallotannins are linked by depside bonds. Ellagitannins usually comprise, among others, galloyl units and/or sanguisorboyl units bounded to a sugar moiety as well as hexahydroxydiphenoyl units. Particularly suitable ellagitannins, for example, comprise punicalagins. In particularly suitable compositions of the present disclosure, suitable tannins according to component c1) comprise tannic acid and/or at least one tannic acid derivative, and/or gallic acid and/or at least one gallic acid derivative, and/or pyrogallic acid and/or at least one pyrogallic acid derivative, and/or ellagic acid and/or ellagic acid derivatives.

According to another preferred embodiment, the described effects are also obtained by a composition comprising at least one extract containing tannins. In addition or alternatively, these extracts can contain tannic acid and/or at least one tannic acid derivative, and/or gallic acid and/or at least one gallic acid derivative, and/or pyrogallic acid and/or at least one pyrogallic acid derivative, and/or ellagic acid and/or at least one ellagic acid derivative. Such suitable extracts can preferably be selected from the group consisting of oak extract, pomegranate extract, witch hazel bark extract, pink gallica petal extract, starry lady's mantel extract, myrobalan extract, and mixtures thereof. Extracts as referred to above in connection with the present disclosure are generally present in the form of a dry substance, most often in powder form. According to a suitable embodiment, extracts in dry substance, in particular in powder form, are added to an aqueous system to form, for example, a beverage of the present disclosure. These extracts usually contain significant amounts of tannins. For example, oak extracts are available which contain about 40 weight percent tannins such as ellagitannins, or with suitable pomegranate extracts, punicalagins are present in an amount of about 40 weight percent.

Furthermore, it has been found that those compositions of the present disclosure, in case of being in the form of an aqueous system, in particular in the form of a sweetened composition, e.g., a beverage, exhibit good results in terms of improved sweetening and/or aroma profile which comprise:

10 to 900 mg/L, in particular 150 to 700 mg/L, and more in particular 300 to 600 mg/L, oak extract and/or 5 to 600 mg/L, in particular 130 to 490 mg/L, and more in particular 220 to 390 mg/L, pomegranate extract and/or 5 to 600 mg/L, in particular 130 to 490 mg/L, and more in particular 220 to 390 mg/L, witch hazel bark extract and/or 5 to 600 mg/L, in particular 130 to 490 mg/L, and more in particular 220 to 390 mg/L, pink gallica petal extract and/or 5 to 600 mg/L, in particular 130 to 490 mg/L, and more in particular 220 to 390 mg/L, starry lady's mantel extract and/or 5 to 600 mg/L, in particular 130 to 490 mg/L, and more in particular 220 to 390 mg/L, myrobalan extract.

Due to the sweetening power of rebaudioside compounds, if present in the compositions of the present disclosure, they can—apart from sucrose—be void of any sweet-tasting natural carbohydrates and/or any sweet-tasting sugar alcohols. It has surprisingly been found that with some embodiments beverages containing or being made up by the composition of the present disclosure furnish even better results in particular in terms of mouthfeel, aftertaste and aroma profile if besides components a1), b1), and c1), they also comprises at least one rebaudioside compound.

In general, suitable rebaudioside compounds comprise rebaudioside A, rebaudioside B, rebaudioside D, rebaudioside C, rebaudioside E, and rebaudioside F, and preferably rebaudioside A, rebaudioside B, and rebaudioside D while being essentially free of rebaudioside C, rebaudioside E, and/or rebaudioside F, more in particular essentially free of rebaudioside C, rebaudioside E, and rebaudioside F.

In case *stevia* compounds such as rebaudiosides are present in the compositions of the present disclosure, it has been found to that in suitable embodiments rebaudioside A can be present in an amount in the range from 85.0 to 95.0 wt-% and preferably in the range from 86.0 to 94.3 wt-%, rebaudioside B can be present in an amount in the range from 0.2 to 1.2 wt-% and preferably in the range from 0.3 to 0.9 wt-%, and/or rebaudioside D can be present in an amount in the range from 4.8 to 13.8 wt-% and preferably in the range from 5.4 to 13.1 wt-%.

In further suitable compositions of the present disclosure which contain at least one *stevia* compound, said compound is a mixture comprising, or in particular consisting of, rebaudioside A, rebaudioside B, and rebaudioside D wherein, based on the total weight of rebaudioside A, rebaudioside B, and rebaudioside D, rebaudioside A is present in an amount in the range from 80.0 to 99.0 wt-%, in particular in the range from 85.0 to 95.0 wt-% and more preferably in the range from 86.0 to 94.3 wt-%, rebaudioside B is present in an amount in the range from 0.1 to 1.5 wt-%, in particular in the range from 0.2 to 1.2 wt-% and more preferably in the range from 0.3 to 0.9 wt-%, and rebaudioside D is present in an amount in the range from 0.9 to 18.5 wt-%, in particular in the range from 4.8 to 13.8 wt-% or in the range from 5.4 to 13.1 wt-%.

To this end, also those compositions are preferred in terms of reduced sugar content in which based on the total weight of rebaudioside A, rebaudioside B, and rebaudioside D, rebaudioside A is present in an amount in the range from 90.5 to 94.0 wt-%, rebaudioside B is present in amount in the range from 0.2 to 1.0 wt-%, and rebaudioside D is present in amount in the range from 5.8 to 8.5 wt-%; or wherein, based on the total weight of rebaudioside A, rebaudioside B, and rebaudioside D, rebaudioside A is present in an amount in the range from 90.9 to 94.4 wt-%, rebaudioside B is present in amount in the range from 0.2 to 0.5 wt-%, and rebaudioside D is present in amount in the range from 5.4 to 8.6 wt-%.

Improved aroma profiles can also be obtained with compositions of the present disclosure which, based on the total weight of rebaudioside A, rebaudioside B, and rebaudioside D, do not contain more than 0.1 wt.-% rebaudioside C, rebaudioside E, rebaudioside F, stevioside, dulcoside, or steviolbioside, or more of any other steviolglycoside different from rebaudioside A to F, stevioside, dulcoside, rubusoside, and steviolbioside.

Suitable steviol glycosides include, among others, such as rebaudioside A, rebaudioside B, rebaudioside D, rebaudioside C, rebaudioside E, rebaudioside F, stevioside, dulcoside, rubusoside, and steviolbioside. These can be detected/determined according to HPLC-UV as specified in JECFA (2010) Steviol Glycosides, FAO JECFA Monograph 10, FAO, Rome. Particularly preferred steviol glycosides are glucosylated steviol glycosides. Rather suitable steviol glycoside embodiments also include enzymatically modified steviol glycosides such as glycosylated steviol glycosides and glucosylated steviol glycosides. For example, as suitable enzymes having glucosylation potential, glucansucrase and fructansucrase enzymes of different lactobacilli can be used, such as *Lactobacillus reuteri*. According to a preferred embodiment, the enzymatically modified steviol glycoside is modified, or in particular exclusively modified, at the C-19 site of the steviol glycoside, for example with a single glucose residue. Steviol glycoside which can for example be enzymatically modified can be selected from the group consisting of Stevioside, Rebaudiosides including Rebaudioside A, Rebaudioside C, Rebaudioside D, and Rebaudioside E, Dulcoside compounds, and mixtures thereof, Steviosides and in particular Rebaudiosides such as Rebaudioside A being preferred. With the present disclosure it is also possible to not only make use of highly purified product samples of individual steviol glycosides such as rebaudiosides A, B, and D, but to also employ crude product samples of rebaudiosides A, B, and D thereof. The compositions of the present disclosure can, for example, also contain residual plant components or residual moisture. However, it is preferred to make use of purified steviol glycosides such as rebaudioside A, B, and D starting components. According, for example, to the present disclosure, 100 g of such purified rebaudioside may in some embodiments contain about 0.1 g or less of other steviol glycosides as described herein.

Suitable compositions of the present disclosure can further comprise at least one flavoring ingredient selected from the group consisting of cardamom, ginger, galangal, cinnamon, clove, nutmeg, nutmeg oil, cola nut, cola nut extract, coca leaf, nutmeg blossom, pepper, mustard seed oil and mustard seed, mint, thyme, rosemary, elderberry, pine, mace, licorice, licorice extract, hibiscus, green tea, black tea, guyausa, rooibos, honeybush, oolong, earl grey, chamomile, sage, lemon, lemon juice concentrate, orange, orange oil, grapefruit, tangerine, lime, lime oil, pomelo, bergamot, bitter orange, yuzu, dekopon, mikan, manderine, schekwasha, caramel, tonka bean, honey, vanilla, cacao, and mixtures thereof. Further suitable embodiments of the compositions of the present disclosure comprise alternatively to the aforementioned flavoring agents or in particular in addition to at least one of the aforementioned flavoring ingredients taurine or caffeine, more preferably taurine and caffeine.

The compositions of the present disclosure, in particular when in the form of a beverage, which may also contain at least one sweet-tasting monosaccharide, preferably glucose, and/or, besides sucrose, at least one sweet-tasting disaccharide, furnish or have, resp., in particular even with a caloric content well below 3.6 kcal/g, an improved aroma profile and a rather natural sweetness sensation as obtained when using sweet-tasting carbohydrates alone in typical amounts.

Suitable embodiments of the compositions of the present disclosure can further comprise at least one thickening agent and/or at least one organic acid and/or at least one inorganic acid, in particular phosphoric acid. Also with these compositions, beverages can be obtained having an improved mouthfeel and/or freshness. The improvement in mouthfeel with the compositions of the present disclosure can also be caused by the use of thickening agents. Alternatively, or in combination, physiologically acceptable salts of the aforementioned acids can be used as well. Preferred results in terms of aroma development and perception of sweetness can be obtained when fumaric acid, gluconic acid, glycolic acid, mandelic acid, oxalic acid and salicylic acid, lactic acid, tartaric acid, anisic acid, malic acid or citric acid or a mixture of these acids is used. Preferably malic acid or citric acid, or a mixture of malic acid and citric acid, are present in the compositions, and in particular, the beverages of the present disclosure. Here, it has been found to be advantageous to make use of two organic acids, preferably malic acid and citric acid. The relative amounts of the organic acids, in particular of a pair of organic acids, can be varied in wide ranges. According to one preferred embodiment, these two organic acids, in particular malic acid and citric acid, are employed in a 1:1 weight ratio. Moreover, with malic acid it has surprisingly been found that, with the compositions of the present disclosure, a mild aroma profile can be obtained. Moreover, it has also been surprisingly found that by concomitant use of malic acid and another organic acid, in particular citric acid, a rather fruity and fresh taste impression can be obtained. Both malic acid and citric acid, alone and in combination, are suited to improve the sweetness and acid profile of beverages containing or being made up by the compositions of the present disclosure and are also able to generate a pleasant development of the overall aroma profile and also of the sweetness sensation.

Suitable thickening agents are selected from the group consisting of starch, starch-based thickeners, xanthan, pectins, agar agar, carrageenan, alginic acid, and locust bean gum, or mixtures thereof. Suitable organic acids are selected from the group consisting of citric acid, malic acid, tartaric acid, fumaric acid, gluconic acid, lactic acid, glycolic acid, mandelic acid, oxalic acid, and salicylic acid, or mixtures thereof.

The compositions of the present disclosure in one embodiment can also comprise at least one artificial sweetener, in particular aspartame, sucralose, neotame, alitame, glucin, acesulfame potassium, cyclamate, saccharine, or mixtures thereof.

In particular, the compositions of the present disclosure can be used for sweetening carbonated beverages, in particular soft drinks or energy drinks, but can also be used for sweetening non-carbonated beverages. The compositions of the present disclosure can in particular be used for sweetening, in particular carbonated, energy drinks such as energy drinks which contain taurine and/or caffeine, more in particular taurine and caffeine. Accordingly, the compositions of the present disclosure can as such also be used for energy drinks or being present in the form of an energy drink.

The compositions of the present disclosure can also comprise, for example when used with or as energy drinks, further ingredients such as sodium citrate, glucoronolactone, inositol, at least one vitamin, e.g., niacin, pantothenic acid, vitamin B6, vitamin B12, riboflavin, caustic caramel, caustic sulfite caramel, ammonia caramel, sulfite ammonia caramel, or ascorbic acid, or mixtures thereof. The composition of the present disclosure can be used for sweetening and/or preparing beverages, in particular soft drinks or energy drinks. The beneficial effects coming along with the use of the composition of the present disclosure can in particular also be accomplished with carbonated beverages.

The compositions of the present disclosure as well as the beverages of the present disclosure, e.g., soft drinks or energy drinks, in one embodiment can also comprise common additives such as amino acids, coloring agents, bulking agents, modified starches, texturizers, preservatives, antioxidants, emulsifiers, stabilizers, gelling agents or arbitrary mixtures thereof.

Interestingly, the compositions of the present disclosure are also suited to prepare precursor compositions in the form of a syrup, or are present in the form of such syrup, which can be easily stored and transported and can be used on demand for the preparation of, in particular, carbonated beverages.

Suitable beverages according to preferred embodiments comprise rebaudioside A, B, and D in combination are present in the beverage in a concentration, in combination, in the range from 0.01 to 1.0 g/l, preferably from 0.05 to 0.8 g/l, and more preferably from 0.1 to 0.6 g/l (determined at ambient temperature and 1 bar).

According to another preferred embodiment, rebaudioside A, B, and D, in combination, are present in beverages, which—apart from sucrose and rubusoside—are void of natural sweet-tasting carbohydrates and/or sweet-tasting sugar alcohols, in particular void of both, in a concentration in the range from 0.05 to 0.5 g/l, preferably from 0.075 to 0.3 g/l, and more preferably from 0.1 to 0.175 g/l. And, according to still another preferred embodiment, rebaudioside A, B, and D are present in beverages of the present disclosure, which contain besides sucrose and rubusosides other natural sweet-tasting carbohydrates and/or at least one sweet-tasting sugar alcohol, in particular at least one natural sweet-tasting carbohydrate (not being sucrose) but no sweet-tasting sugar alcohol, in particular in a concentration in the range from 0.075 to 0.5 g/l, preferably from 0.1 to 0.4 g/l, and more preferably from 0.18 to 0.3 g/l.

The problem of the present disclosure has also been solved by a method comprising the steps of a) providing a composition according to the present disclosure, b) providing water, and c) mixing components provided under a) and b). The method of the present disclosure, in one suitable embodiment, comprises adding the composition as such to an aqueous system, e.g., under stirring. In another embodiment, the components making up the composition of the disclosure can be added separately or in pairs or the like to an aqueous system.

In case a carbonated beverage shall be prepared according to the process of the present disclosure, a carbonating step (step d) can be added to said process. According to another embodiment, the process of the present disclosure can further comprise the step of adding at least one thickening agent, at least one sweet-tasting natural carbohydrate (in addition to sucrose), at least one sweet-tasting sugar alcohol, at least one organic acid, and/or at least one flavoring ingredient to the composition or to a mixture comprising water and the composition of the present disclosure. The aforementioned components may also be added to water prior to mixing with the composition of the present disclosure. Here, the definitions provided above for the thickening agent, sweet-tasting natural carbohydrate, sweet-tasting sugar alcohol, organic acid, and flavoring ingredient are applicable as well both in terms of general information and preferred embodiments.

Furthermore, it is also possible that the sweet-tasting natural carbohydrates and/or at least one sweet-tasting sugar alcohol are added to the mixture comprising water and the composition prior to and/or after the carbonating step, preferably prior to the carbonating step.

With the present disclosure, compositions have surprisingly been found which furnish beverages having an improved sweetness and aroma profile while simultaneously arriving at significantly reduced sugar content. In a preferred embodiment, these effects can even be accomplished with the compositions of the present disclosure without having to use *stevia* compounds and/or artificial sweeteners.

It has also surprisingly been found that by co-use of rubusosides, the sweetening profile can be improved, in particular during the so-called onset period. Moreover, it has been found that by adding component c1) to the composition of the present disclosure, any long-lasting aftertaste, for example caused by rubusosides and/or *stevia* compounds, can be significantly reduced. By use of the compositions of the present disclosure, sweetened beverages can be obtained which have an overall sweetness profile which, although reduced amounts of sucrose are employed, is essentially identical to the sweetness profile of a beverage having been solely sweetened with sucrose in a higher/regular amount. Thus, with the compositions of the present disclosure, an aroma or sweetening profile can be accomplished which resembles that of beverages having been sweetened with natural sugars only, even with carbonated beverages. It is, thus, possible with the composition of the present disclosure to prepare beverages, in particular carbonated beverages, such as soft drinks and energy drinks which, though having a significantly reduced caloric content, exhibit an improved sweetness and aroma profile and which, in a preferred embodiment, also do not differ significantly in their taste from conventional beverages having been sweetened with natural sugars and/or artificial sweeteners. This also includes that a sweetened sensation is perceived by the consumer already at the very beginning. Without being bound by theory, it is believed that this effect is also based on the concomitant use components a1), b1), and c1).

The beverages of the present disclosure comprise, in particular carbonated, soft drinks and energy drinks. Suitable soft drinks also include cola-flavored soft drinks, wherein cola-flavored soft drinks also encompass cola-flavored-type soft drinks. Also these beverages, when being sweetened with the composition in accordance with the present disclosure, do not or do essentially not exhibit a slow onset of the sensation of sweetness but provide a rather harmonic sweetening profile, and do not or do essentially not have a bitter or licorice-like aftertaste.

In conclusion, it is a benefit of compositions of the present disclosure that beverages can be obtained which contain the natural sugar sucrose in reduced amounts. It is possible to reduce the amount of these natural sugars by, for example, at least 10 wt.-%, preferably by at least 20 wt.-%, and more preferably by at least 30 wt.-% vis-à-vis beverages which do not contain the compositions of the present disclosure.

And, with the present disclosure, it has been accomplished to provide carbonated low-calorie soft drinks and energy drinks which satisfy the sensoric demands of the consumer while simultaneously complying with the provisions of the Commission Regulation (EU) No. 1131/2011.

Moreover, with the present disclosure, it has been surprisingly found that the sweetening compositions of the present disclosure can be used as flavoring substances with modifying properties for spicy flavors, in particular cardamom, ginger, galangal, cinnamon, clove, nutmeg, cola nut, coca leaf, nutmeg blossom, or mustard seed; or for herb flavors, in particular mint, thyme, rosemary, or elderberry; or for tea flavors, in particular hibiscus, green tea, black tea, mate, guyausa, rooibos, honeybush, oolong, earl grey, chamomile, or sage; or for citrus flavors, in particular lemon, orange, grapefruit, tangerine, lime, pomelo, bergamot, bitter orange, yuzu, dekopon, mikan, manderine, or schekwasha; or for brown notes, in particular caramel, tonka bean, vanilla, or cacao. More preferably these compositions can be used as flavoring substances with modifying properties for spicy flavors, in particular cardamom, ginger, galangal, or cinnamon flavors; or for citrus flavors.

The expression flavoring substances with modifying properties or flavorings with modifying properties is known to the person skilled in the art. Guidance can be found in the EU Regulation (EC) No. 1334/2008 of Dec. 16, 2008, on "Flavourings and certain food ingredients with flavouring properties for use in and on foods" (which amended Council Regulation (EEC) No. 1601/91, Regulations (EC) No. 2232/96 and (EC) No. 110/2008 and Directive 2000/13/EC), and in the "Guidance notes on the classification of a flavouring substance with modifying properties and a flavour enhancer" issued by the European Commission on 27 May 2014.

It has also surprisingly been found that the compositions of the present disclosure can be used efficiently for reducing the sucrose content in beverages without or essentially without exhibiting a reduced sweetness sensation vis-à-vis sweetening compositions not containing components b1) and c1), or b1), c1), and d1), or b1), c1), d1) and e1) and/or f1). In this regard, those beverages can be effected properly with the composition of the present which comprise a spicy flavoring substance, in particular cardamom, ginger, galangal, cinnamon, clove, nutmeg, cola nut, coca leaf, nutmeg blossom, or mustard seed; and/or an herb flavoring substance, in particular mint, thyme, rosemary or elderberry; or a tea flavoring substance, in particular hibiscus, green tea, black tea, mate, guyausa, rooibos, honeybush, oolong, earl grey, chamomile, or sage; and/or a citrus flavoring substance, in particular lemon, orange, grapefruit, tangerine, lime, pomelo, bergamot, bitter orange, yuzu, dekopon, mikan, manderine, or schekwasha; and/or a brown note flavoring substance, in particular caramel, tonka bean, vanilla, or cacao. Preferably, the compositions of the present disclosure are used with beverages having a spicy flavoring substance, e.g., ginger, galangal, or cinnamon, and/or a citrus flavoring substance.

It has also been surprisingly found that a combination comprising i) rubusoside and/or at least one rubusoside derivative and/or neohesperitin and/or thaumatine and/or phloretin and/or trilobatin and/or monatin and/or hesperetin and/or at least one enzymatically modified steviol glycoside, in particular rubusoside or at least one rubusoside derivative or neohesperitin or at least one enzymatically modified steviol glycoside or any combination thereof, and ii) at least one tannin, in particular tannic acid and/or at least one tannic acid derivative or a composition or extract containing tannic acid and/or at least one tannic acid derivative, can be used for shortening, in particular with beverages, the lingering sweetness of artificial sweeteners, in particular of *stevia* compounds, and/or for shifting the onset of the temporal sweetness sensation of said artificial sweetener towards that of natural sugars, in particular to that of sucrose.

Although modifications and changes maybe suggested by those skilled in the art, it is the intention of the applicant to embody within the patent warranted hereon all changes and modifications as reasonably and probably come within the scope of this contribution to the art. The features of the present disclosure which are believed to be novel are set forth in detail in the appended claims. The features disclosed in the description and in the claims could be essential alone or in every combination for the realization of the disclosure in its different embodiments.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A composition, comprising:
   a1) 30 to 120 g/l sucrose;
   b1) 30 to 450 mg/l rubusoside and/or at least one rubusoside derivative;
   c1) 25 to 400 mg/l tannic acid and/or at least one tannic acid derivative and/or
   12 to 140 mg/l gallic acid and/or at least one gallic acid derivative and/or
   0.2 to 110 mg/l pyrogallic acid and/or at least one pyrogallic acid derivative and/or
   25 to 275 mg/l ellagic acid and/or at least one ellagic acid derivative; and
   water,
   wherein said composition is an aqueous beverage or a syrup for producing a beverage.

2. The composition according to claim 1, further comprising:
   at least one flavoring ingredient selected from the group consisting of cardamom, ginger, galangal, cinnamon, clove, nutmeg, nutmeg oil, cola nut, cola nut extract, coca leaf, nutmeg blossom, pepper, mustard seed oil and mustard seed, mint, thyme, rosemary, elderberry, pine, mace, licorice, licorice extract, hibiscus, green tea, black tea, maté, guyausa, rooibos, honeybush, oolong, earl grey, chamomile, sage, lemon, lemon juice concentrate, orange, orange oil, grapefruit, tangerine, lime, lime oil, pomelo, bergamot, bitter orange, yuzu, dekopon, mikan, manderine, schekwasha, caramel, tonka bean, honey, vanilla, cacao, and mixtures thereof.

3. The composition according to claim 1, further comprising taurine and/or caffeine.

4. The composition according to claim 1, wherein:
   rebaudioside A, B, and D in combination are present in the beverage in a concentration in the range from 0.01 to 1.0 g/l.

5. The composition according to claim 1, wherein the beverage is a soft drink or an energy drink.

6. The composition according to claim 1, wherein the beverage exhibits essentially a same sweetness sensation vis-à-vis beverages which do not contain components b1) and c1).

7. The composition according to claim 1, further comprising:
   d1) hesperitin and/or thaumatine and/or phloretin and/or trilobatin and/or monatin and/or betain.

8. The composition according to claim 7, comprising 1 to 750 mg/L hesperitin, and/or 0.01 to 10 mg/L thaumatin, and/or 1 to 250 mg/L phloretin, and/or 0.1 to 250 mg/L trilobatin, and/or 0.01 to 20 mg/L monatin, and/or 0.01 to 20 mg/L betain.

9. The composition according to claim 1, further comprising:
   e1) at least one further sweet-tasting natural carbohydrate selected from the group consisting of sweet-tasting natural disaccharides, sweet-tasting natural monosaccharides, sweet-tasting sugar alcohols, and mixtures thereof.

10. The composition according to claim 9, comprising 0.1 to 50 g/L of the further sweet-tasting natural carbohydrates or of any individual sweet-tasting natural carbohydrate according to e1) being present in said composition.

11. The composition according to claim 9, wherein:
    the sweet-tasting natural monosaccharide is selected from the group consisting of fructose, glucose, arabinose, mannose, rhamnose, xylose, tagatose, galactose, and mixtures thereof, and/or
    the sweet-tasting natural disaccharide is selected from the group consisting of trehalose, lactose, maltose, and mixtures thereof, and/or
    the sweet-tasting sugar alcohol is selected from the group consisting of erythritol, glycerol, lactitol, maltitol, mannitol, sorbitol, xylitol, galactitol, and mixtures thereof.

12. The composition according to claim 9,
    wherein the sweet-tasting natural carbohydrates and the sweet-tasting sugar alcohols are present in combination in the beverage in a concentration not above 40 g/l.

13. A method for preparing a beverage or a syrup for producing a beverage, comprising:
    a) providing the composition according to claim 9,
    b) providing the water,
    c) mixing the components provided under a) and b), and
    d) carbonating the beverage, wherein the at least one further sweet-tasting natural carbohydrate and/or at least one sweet-tasting sugar alcohol are added to the mixture comprising said water and said composition prior to and/or after said carbonating the beverage.

14. The composition according to claim 1, further comprising at least one *stevia* compound selected from the group consisting of enzymatically modified steviol glycosides, rebaudiosides, and mixtures thereof.

15. The composition according to claim 14, comprising:
f1) 0.01 to 0.8 g/l of the at least one *stevia* compound.

16. The composition according to claim 14, wherein the at least one *stevia* compound is a mixture comprising rebaudioside A, rebaudioside B, and rebaudioside D, wherein, based on a total weight of the rebaudioside A, rebaudioside B, and rebaudioside D, the rebaudioside A is present in an amount in the range from 80.0 to 99.0 wt-%, the rebaudioside B is present in an amount in the range from 0.1 to 1.5 wt-%, and the rebaudioside D is present in an amount in the range from 0.9 to 18.5 wt-%.

17. The composition according to claim 16, wherein based on the total weight of the rebaudioside A, rebaudioside B, and rebaudioside D:
the rebaudioside A is present in an amount in the range from 90.5 to 94.0 wt-%;
the rebaudioside B is present in amount in the range from 0.2 to 1.0 wt-%; and
the rebaudioside D is present in amount in the range from 5.8 to 8.5 wt-%.

18. The composition according to claim 16, wherein based on the total weight of the rebaudioside A, rebaudioside B and rebaudioside D:
the rebaudioside A is present in an amount in the range from 90.9 to 94.4 wt-%;
the rebaudioside B is present in an amount in the range from 0.2 to 0.5 wt-%; and
the rebaudioside D is present in an amount in the range from 5.4 to 8.6 wt-%.

19. Use of the composition according to claim 1 for sweetening non-carbonated or carbonated beverages or as non-carbonated or carbonated beverages.

20. Use of the composition according to claim 1 for preparing a syrup as a precursor in the preparation of a beverage, or for preparing a beverage.

21. A method for preparing a beverage or a syrup for producing a beverage, comprising:
a) providing a composition according to claim 1,
b) providing water and
c) mixing components provided under a) and b).

22. The method according to claim 21, further comprising:
d) carbonating the beverage.

23. The method according to claim 21, further comprising:
adding at least one thickening agent, at least one sweet-tasting natural carbohydrate, at least one sweet-tasting sugar alcohol, at least one organic acid, and/or at least one flavoring ingredient to said composition prior to mixing with the water or to a mixture comprising the water and said composition and/or to the water prior to mixing with said composition.

24. Use of the composition according to claim 1 as a flavoring substance with modifying properties for:
spicy flavors, comprising cardamom, ginger, galangal, cinnamon, clove, nutmeg, cola nut, coca leaf, nutmeg blossom, or mustard seed; or
herb flavors, comprising mint, thyme, rosemary, or elderberry; or
tea flavors, comprising hibiscus, green tea, black tea, maté, guyausa, rooibos, honeybush, oolong, earl grey, chamomile, or sage; or
citrus flavors, comprising lemon, orange, grapefruit, tangerine, lime, pomelo, bergamot, bitter orange, yuzu, dekopon, mikan, manderine, or schekwasha; or
brown notes, comprising caramel, tonka bean, vanilla, or cacao.

25. Use of the composition according to claim 1 as a flavoring substance with modifying properties for:
spicy flavors, comprising cardamom, ginger, galangal, or cinnamon flavors; or
citrus flavors.

26. Use of the composition according to claim 1, for reducing a sucrose content in a beverage without or essentially without exhibiting a reduced sweetness sensation vis-à-vis compositions not containing components b1) and c1).

27. Use of the composition according to claim 26, wherein said beverage comprises:
a spicy flavoring substance, in particular cardamom, ginger, galangal, cinnamon, clove, nutmeg, cola nut, coca leaf, nutmeg blossom, or mustard seed;
an herb flavoring substance, in particular mint, thyme, rosemary, or elderberry;
a tea flavoring substance, in particular hibiscus, green tea, black tea, maté, guyausa, rooibos, honeybush, oolong, earl grey, chamomile, or sage;
a citrus flavoring substance, in particular lemon, orange, grapefruit, tangerine, lime, pomelo, bergamot, bitter orange, yuzu, dekopon, mikan, manderine, or schekwasha; and/or
a brown note flavoring substance, in particular caramel, tonka bean, vanilla, or cacao.

* * * * *